United States Patent [19]

Peters et al.

[11] 4,056,361

[45] Nov. 1, 1977

[54] VIAL OR OTHER CONTAINER, AND CARRIER THEREFOR

[75] Inventors: Ann Margaret Peters; Geoffrey Stuart Greaves; Ian Robert Clark; Roger Leonard Holder; Roger Abraham Bunce, all of Birmingham, England

[73] Assignee: The Secretary of State for Social Services in Her Britannic Majesty's Government of the United Kingdom of Great Britain and Northern Ireland, London, England

[21] Appl. No.: 694,971

[22] Filed: June 11, 1976

[30] Foreign Application Priority Data

June 11, 1975 United Kingdom ............... 25114/75

[51] Int. Cl.[2] .......................... B01L 3/14; B01L 9/06; G01F 19/00; G01N 31/00

[52] U.S. Cl. ........................................ 23/259; 23/292; 40/125 H; 73/427; 195/127; 198/383; 206/459; 211/77; 220/23.4; 220/69; 248/148

[58] Field of Search ..................... 23/259, 292, 253 R; 141/130, 129; 73/427; 248/148; 211/77, 74 US, 69.2, 69.4; 233/26; 356/246, 244; 198/383, 397; 40/125 H; 206/459, 557, 562, 564; 220/23.4, 69, 70 US

[56] References Cited

U.S. PATENT DOCUMENTS

| | | | |
|---|---|---|---|
| 3,190,731 | 6/1965 | Weiskopf | 23/292 |
| 3,490,290 | 1/1970 | Bilson | 73/427 |
| 3,607,098 | 9/1971 | Strande | 23/259 |
| 3,617,222 | 11/1971 | Matte | 23/253 R X |
| 3,680,967 | 8/1972 | Engelhardt | 23/253 R X |
| 3,725,010 | 4/1973 | Penhasi | 23/259 X |
| 3,905,772 | 9/1975 | Hartnett et al. | 23/259 |
| 3,951,608 | 4/1976 | Trod | 23/259 |

FOREIGN PATENT DOCUMENTS

| | | | |
|---|---|---|---|
| 578,807 | 6/1933 | Germany | 23/292 |

*Primary Examiner*—Joseph Scovronek
*Attorney, Agent, or Firm*—Reed, Smith, Shaw & McClay

[57] ABSTRACT

The invention relates to a vial located in a pocket in a carrier.

The pocket has an upwardly opening inlet and a plane, bottom cam surface and the vial has a complementary, plane, bottom cam surface. Both cam surfaces are inclined to the axes of the vial and pocket so that on lowering the vial into the pocket through its inlet, the cam surfaces interact so that when the vial is fully home in the pocket, it occupies a predetermined position of angular displacement about the vial axis.

The carrier may be in the form of a turntable having a plurality of such pockets around the peripheral region of the turntable. The pockets may open outwardly from the center of the turntable through the peripheral surface of the turntable so that labels fixed and appropriately positioned on the vial walls are visible through the openings in the peripheral surface when the vials are fully home in their pockets.

9 Claims, 3 Drawing Figures

VIAL OR OTHER CONTAINER, AND CARRIER THEREFOR

This invention relates to a vial, carrier for a vial, and to the combination of a carrier and a vial or other container.

Various forms of automatic specimen investigating machines, for example for use in medical applications such as analysis of blood samples, have been devised in which liquid samples, such as samples of serum, plasma, or enzymes, are stored in vials located in pockets arranged equally spaced around the peripheral region of a horizontal turntable. The turntable is advanced in indexing fashion and during each dwell period of the turntable a measured quantity of sample is transferred by a sample transfer head to the section of the machine where the investigations are carried out on the samples.

A disadvantage which is encountered is that where the vials are rotatable in their pockets about their axes, they do not occupy a predetermined position of angular displacement when they are fully-home in their pockets but instead become fully located in the particular angular displacement in which they are inserted.

The invention aims to overcome this disadvantage.

According to a first aspect of the invention there is provided a vial comprising a side wall which is substantially circular in cross-section taken perpendicular to the axis of the vial, the vial further comprising a plane bottom cam surface which is inclined at an acute angle to the vial axis so that when the vial is lowered into a vial locating pocket in a carrier, having an upwardly opening inlet, through which the vial can be lowered into the pocket in any position of angular displacement about the container axis, and a cam surface which is complementary to the cam surface of the vial, the cam surfaces interact in such manner that the vial when fully home in the pocket occupies a predetermined position of angular displacement about the vial axis.

According to a second aspect of the invention there is provided a vial comprising a side wall and a plane, bottom cam surface which is inclined at an acute angle to the vial axis and which extends over only a part of the height of the vial, the cam surface being such that when the vial is lowered into a vial locating pocket in a carrier, having an upwardly opening inlet, through which the vial can be lowered into the pocket in any position of angular displacement about the container axis, and a cam surface which is complementary to the cam surface of the vial, the cam surfaces interact in such manner that the vial when fully home in the pocket occupies a predetermined position of angular displacement about the vial axis.

According to a third aspect of the invention there is provided a carrier for a vial, including a vial locating pocket with an upwardly opening inlet and an internal, plane, bottom cam surface which extends across the width of the pocket and is inclined at an acute angle to the pocket axis so that when the vial, having a bottom cam surface, which is complementary to the cam surface of the carrier, is lowered into the pocket, through the inlet thereof, in any position of angular displacement about the vial axis, the complementary cam surface interacts with the internal cam surface of the pocket in such manner that the vial when fully home in the pocket occupies a predetermined position of angular displacement about the vial axis.

According to a fourth aspect of the invention there is provided, in combination, a carrier and a vial or other container, the carrier having a container locating pocket, in which the container is located, with an upwardly opening inlet through which the container can be lowered into the pocket in any position of angular displacement about the container axis, the container having a plane, bottom cam surface which interacts with a complementary cam surface of the pocket, when the container is lowered into the pocket, in such manner that said container when fully home in the pocket occupies a predetermined position of angular displacement about the container axis.

For a better understanding of the invention and to show how the same may be carried into effect, reference will now be made, by way of example, to the accompanying drawings, in which.

Figure 1:
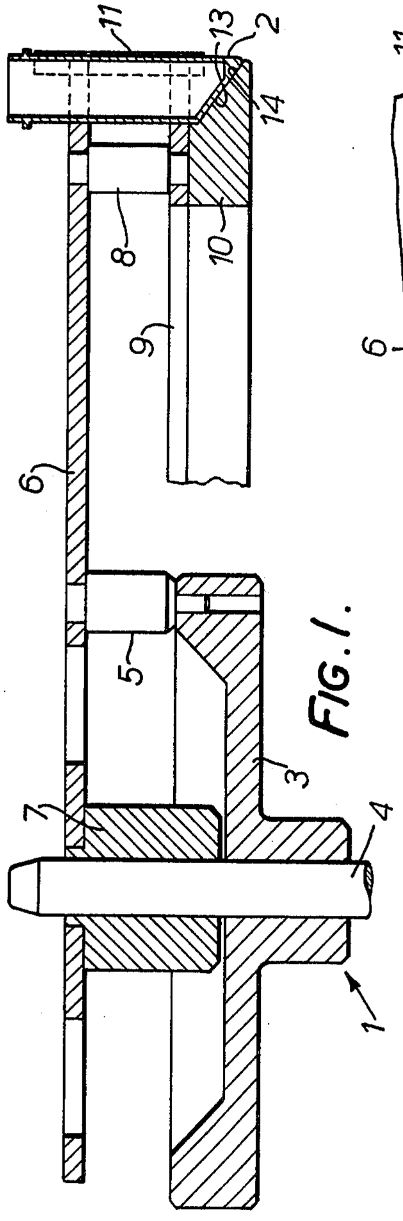
FIG. 1 is a vertical section through part of a carrier, showing a pocket in the carrier in which a sample cup or vial is located.
Figure 2:
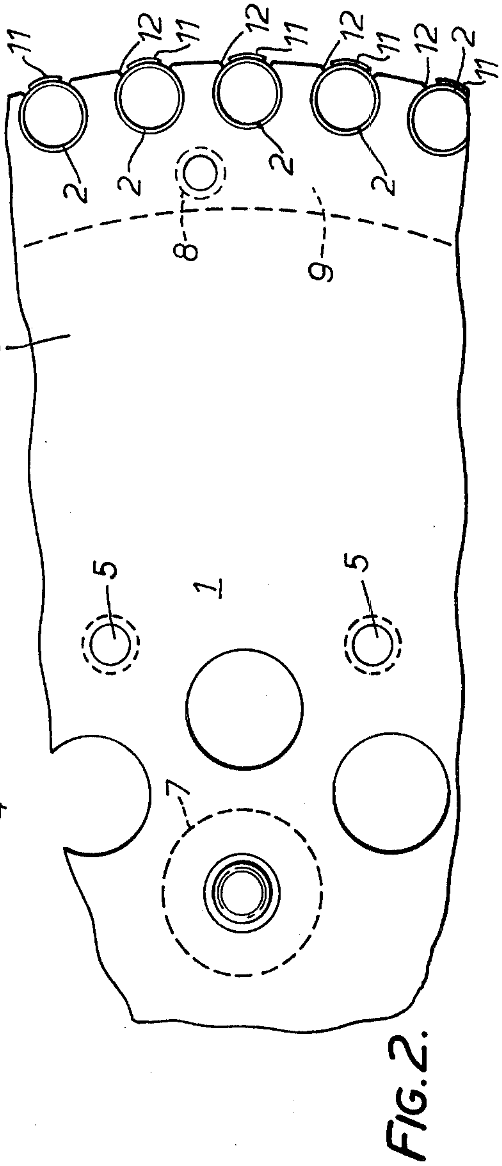
FIG. 2 is a plan view of FIG. 1.

Referring to FIGS. 1 and 2, the carrier is in the form of a circular turntable 1 rotatable about a central axis and carrying a plurality of substantially cylindrical cups or vials 2 substantially evenly spaced around the peripheral region of, and from the central axis of, the turntable.

As FIG. 1 clearly shows, the turntable includes a drive plate 3 mounted on a shaft 4 which in use is driven in indexing fashion by any suitable drive means (not shown). Mounted above the drive plate and held spaced away from the drive plate by way of drive pegs 5 (FIGS. 1 and 2) is a circular upper plate 6 having a hub 7 fitted around the shaft 4. These pegs cause the upper plate 6 to co-rotate with the drive plate 3 when the latter is driven in operation of the turntable. Extending downwardly from the outer peripheral region of the plate 6 are a number of spacing columns 8 of which one is shown in FIGS. 1 and 2. The lower ends of the columns 8 carry, through intermediary of an annular centre plate 9, an annular ring 10.

The upper plate 6 and centre plate 9 are apertured to provide pockets at uniformly spaced apart locations around the peripheral region of the turntable, and located within these pockets are the vials 2. Any one of the vials may be removed upwardly from its pocket through the opening in the upper plate 6 and subsequently reinserted into its pocket.

Each vial has at the bottom thereof a plane, cam surface 13 which is inclined at an acute angle to the longitudinal axis of the vial and extends over only a part of the height of the vial, this cam surface cooperating with a complementary plane cam surface 14 provided on the annular ring 10 so that when the vial is full home in its pocket it occupies a predetermined position of angular displacement about the vial axis in the pocket.

Each pocket, in addition to having an upwardly opening inlet in the upper plate 6, opens outwardly from the central axis of the turntable through the peripheral surface of the turntable as indicated by reference numeral 12 in FIG. 2. The purpose of the opening 12 is to allow a coded label 11, fixed to the vial in such a position as to be visible from the exterior. The opening 12 is not, however, large enough to allow the vial to be removed from its pocket in the radial direction, the portions of the pocket wall which are immediately adjacent the opening 12 preventing such removal of the vial.

Each vial is effectively self-locating, especially if the angle $\alpha$ (FIG. 3), being the angle at which the surfaces 13, 14 are inclined to any plane normal to the axis of the vial, is substantially 37°, that is to say if the surfaces 13, 14 are inclined to the vial and pocket axes by substantially 53°.

Figure 3:
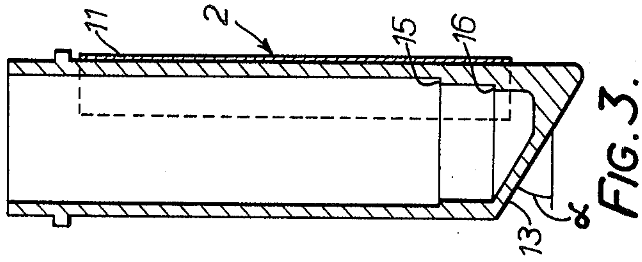
FIG. 3 is a vertical section on an enlarged scale of one of the vials.

Referring to FIG. 3, the wall of each vial is stepped at two levels 15, 16 to indicate respectively an upper and a lower level in the vial which are required for accurate filling purposes. If the user of the turntable fills each vial to above the lower level, there will always be a sufficient quantity of the sample to allow the desired maximum number of different investigations to be carried out. Moreover, providing the sample level is beneath the upper level, the degree of "carry-over", i.e. the transfer of sample from one vial to the next by a sample transfer head used for transferring a measured quantity of sample to an automatic specimen investigating machine where the desired investigations are carried out, is kept to an acceptable value. The height of each vial is sufficient to allow the coded label to be fixed vertically to the outside surface of the vial. Moreover, the necessary height required for this purpose is sufficient to keep evaporation of the sample to a low value. For long storage times, a cap may be fitted to the top of the vial. It will be noted from FIG. 3 that the inside and outside surfaces of the vial conform closely with one another. This gives a substantially uniform wall thickness for ease of manufacture. It is to be noted that because of the inclined bottom of the vial, wastage of the sample after sampling tends to be less than if the vial were to have a flat bottom.

It is believed to be most advantageous to make the vials by injection moulding of plastics material, but it is alternatively possible for the vials to be made of glass. However, to form the turntable by injection moulding is thought to prove too expensive and it is for this reason that it has been proposed to fabricate the turntable from the various parts shown in FIG. 2.

Preferably, each label has a bar code which is read by a reader mechanism which synchronises the code as read with the results obtained from the automatic specimen investigating machine so as to correlate the results with the samples which gave rise to those results. The label may alternatively be simply a stick-on label on which a suitable sample identification is written.

It will be appreciated from the foregoing that the main advantage of the described turntable and vials is that the angled cam surfaces of the turntable and vials ensures that the vials may be easily placed by the user in the pockets in the turntable with the label facing radially outwardly.

We claim:

1. A combination comprising a carrier and self-locating container, said carrier including at least one container receiving pocket, said pocket having an inlet with a cross-section to receive a container in any angular displacement about the pocket axis and an internal, plane cam surface located opposite to said opening, said cam surface being inclined at an acute angle to the pocket axis for angular aligning during positioning within said pocket a container having a complementary cam surface, and a container having a cam surface complementary to the cam surface of said pocket, whereby said container is aligned in a predetermined angular displacement by and with respect to the cam surface of the pocket during positioning within said carrier pocket.

2. A combination according to claim 1, wherein said container is stepped to indicate at least an upper and a lower level.

3. A combination according to claim 1, wherein the carrier comprises a turntable mounted to rotate about a central axis and including a plurality of container receiving pockets at respective locations substantially equally spaced from the said central axis and distributed uniformly about the said central axis, and wherein at least one container is located in a said pocket.

4. A combination according to claim 3, wherein the pockets open outwardly from the said central axis through the peripheral surface of the turntable, there being a label fixed to each container in such a position that the label is visible through the opening of its pocket in the said peripheral surface.

5. A combination according to claim 1 wherein the cross-section of the container above the cam surface is circular.

6. A combination according to claim 1 wherein the cross-section of the pocket is circular.

7. A combination in accordance with claim 1 wherein the cam surface of the container extends over a portion of the height of the container.

8. A combination in accordance with claim 1 wherein the cam surface of the pocket extends across the width of the pocket.

9. A combination according to claim 1 wherein the cam surfaces of said container and said container pocket each have an angle of inclination of substantially 53° to the respective axis.

* * * * *